T. V. Le ROY.

Assignor of one-half interest to ADDISON DAY.

THE MANUFACTURE OF AXLE-BOXES.

No. 7,482. Reissued Jan. 30, 1877.

WITNESSES

Robert Everett

George E. Upham.

INVENTOR

Francis V. Le Roy.

Gilmore, Smith & Co.

ATTORNEYS.

N. PETERS, PHOTO-LITHOGRAPHER, WASHINGTON, D. C.

UNITED STATES PATENT OFFICE.

TUNNIS V. LE ROY, OF UTICA, NEW YORK, ASSIGNOR OF ONE-HALF INTEREST TO ADDISON DAY.

IMPROVEMENT IN THE MANUFACTURE OF AXLE-BOXES.

Specification forming part of Letters Patent No. 182,940, dated October 3, 1876; reissue No. 7,482, dated January 30, 1877; application filed December 9, 1876.

*To all whom it may concern:*

Be it known that I, TUNNIS V. LE ROY, of Utica, in the county of Oneida and State of New York, have invented a new and valuable Improvement in Axle-Skeins; and I do hereby declare that the following is a full, clear, and exact description of the construction and operation of the same, reference being had to the annexed drawings, making a part of this specification, and to the letters and figures of reference marked thereon.

Figure 1:
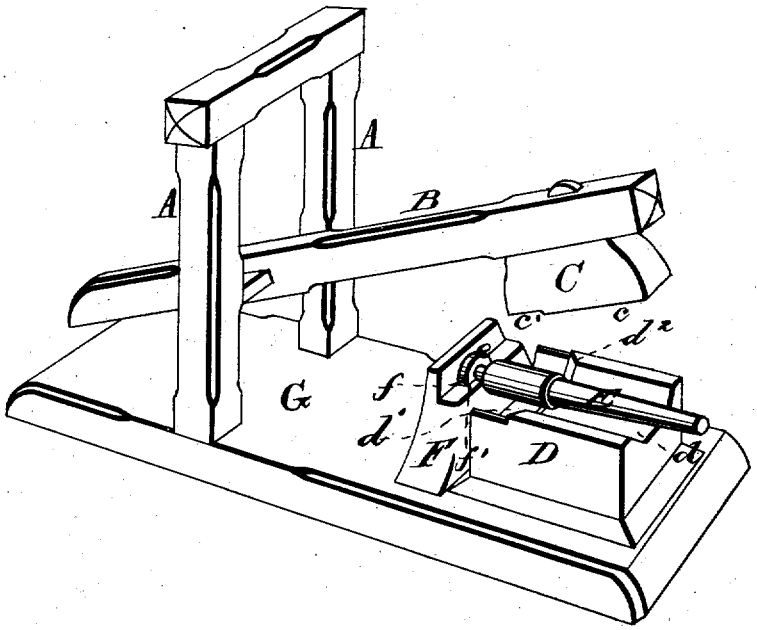
Figure 2:
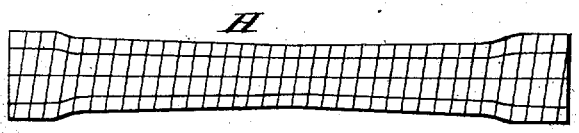
Figure 3:
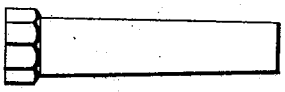

Figure 1 of the drawings is a representation of a perspective view of my machine for making axle-boxes, and Fig. 2 is a plan view of the axle-skein in its rough state. Fig. 3 is a plan view of my axle-box when finished.

This invention consists in an axle-box made of a spirally-wound metal bar; also, in the process of manufacturing said axle-boxes, as hereinafter fully set forth.

In the annexed drawings, A A designate standards, between which is pivoted beam B, carrying on its longer end hammer C. The under side of said hammer is formed into or provided with a shoulder or raised portion, *c*, and a recess, *c'*. Under this hammer and die I fix a stationary die, D, on a block or anvil. The surface of said stationary die is recessed, so as to present grooves *d* and $d^1$ and shoulder $d^2$. The office of said dies is to shape the outside of the axle-boxes, as hereinafter described.

E is a welding-pin, conforming in shape to the inside of an axle-box. It is held from lateral displacement by a supporting-block, F, which is provided with a recess, *f*, and entrance *f'*, which receive and lock a collar, *e*, on the end of said welding-pin. G designates a bed-piece, on which all the above parts are supported. H, Fig. 2, designates two axle-boxes united at their smaller ends, and in a rough state.

The process of manufacture is as follows: I weld together a bar of iron and a bar of steel, one lying flat upon the other. I then draw out this compound bar until it is about the size of a horseshoe-nail rod. I then wind this compound rod about a tapering mandrel, with the steel inside, in the same way that twist gun-barrels are wound. This compound rod being long enough to compose two axle-boxes, after using one-half of it in winding one box, I then begin at the other end of said rod and wind another box, the two boxes being connected at their smaller ends, as shown in Fig. 2. These boxes are then heated, and the coils welded by blows upon their ends. After this they are reduced to the proper thickness and shape by means of the trip-hammer C, die D, and welding-pin E, already described.

The object of making said welding-pin E stationary, so far as regards lateral motion, is to cause the shoulders on the inside of each axle-box so constructed to correspond to the shoulders on the outside thereof. A slight vertical vibration is allowed said welding-pin E, for convenience in manipulation.

By arranging my two metals as above described I produce a device which is hard on its inner face (which bears the friction) and soft on its outer face, where a cheaper material will do as well. The softer metal, being less elastic, also holds the hard inner metal from springing out of shape during the process of construction.

By winding the metal I produce a box in which the grain of the metal runs around the axle instead of being parallel thereto, and so gives the box greater strength to endure strains; also, any flaws in the welding will occupy less space longitudinally, and will injure less the ability of the axle-box to withstand wear.

By constructing two metal boxes out of one rod I am enabled to hold one box by the tongs while hammering the other; but if each box were constructed separately, there would be nothing to hold on by.

Car-axle boxes, as well as wagon-axle boxes, may be constructed by the above-described mechanism and process.

What I claim as new, and desire to secure by Letters Patent, is—

1. As an improved article of manufacture, an axle-box composed of a spirally-wound bar, as and for the purpose set forth.

2. An axle-box composed of iron and steel wound spirally, the steel being on the inner side, substantially as set forth.

3. A welding-pin, E, conforming in shape to the inside of an axle-box, in combination with a movable upper die, having shoulder $c$ and recess $c'$, and with a fixed lower die, D, having grooves $d$ $d^1$, and shoulder $d^2$, substantially as set forth.

4. The process herein described of manufacturing axle-boxes, consisting, first, in winding a rod of metal around a suitable mandrel or former, then in welding the coils by blows upon the ends of the box, and, finally, by shaping said box by means of the die and a welding-pin, substantially as set forth.

In testimony that I claim the above I have hereunto subscribed my name in the presence of two witnesses.

TUNNIS V. LE ROY.

Attest:
G. W. ADAMS,
G. W. SMITH.